(12) United States Patent
Chakrovorthy et al.

(10) Patent No.: US 8,922,713 B1
(45) Date of Patent: Dec. 30, 2014

(54) AUDIO AND VIDEO SYNCHRONIZATION

(71) Applicant: Amazon Technologies, Inc., Reno, NV (US)

(72) Inventors: Sreeram Raju Chakrovorthy, Campbell, CA (US); Ziqiang Huang, San Jose, CA (US); Jaee Patwardhan, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/870,788

(22) Filed: Apr. 25, 2013

(51) Int. Cl.
*H04N 7/26* (2006.01)
*H04N 9/475* (2006.01)
*H04N 5/04* (2006.01)

(52) U.S. Cl.
CPC ........................................ *H04N 5/04* (2013.01)
USPC ...................................... 348/515; 375/240.28

(58) Field of Classification Search
CPC .......... H04N 21/2368; H04N 21/4305; H04N 21/4307; H04N 21/4341; H04N 21/4343; H04J 3/0608; H04J 3/0632
USPC ............... 348/513, 515, 14.12; 370/503, 509, 370/514, 516; 375/240.28
See application file for complete search history.

(56) References Cited

U.S. PATENT DOCUMENTS

| | | | | |
|---|---|---|---|---|
| 6,031,584 A | * | 2/2000 | Gray | 375/240.28 |
| 6,598,172 B1 | * | 7/2003 | VanDeusen et al. | 713/503 |
| 6,928,473 B1 | * | 8/2005 | Sundaram et al. | 709/224 |
| 7,664,057 B1 | * | 2/2010 | Wu et al. | 370/260 |
| 8,495,236 B1 | * | 7/2013 | Glasser | 709/231 |
| 2005/0259754 A1 | * | 11/2005 | Ho et al. | 375/240.28 |
| 2006/0013565 A1 | * | 1/2006 | Baumgartner | 386/96 |
| 2006/0170819 A1 | * | 8/2006 | Lim et al. | 348/385.1 |
| 2008/0291863 A1 | * | 11/2008 | Agren | 370/315 |
| 2009/0080539 A1 | * | 3/2009 | Alekseenko | 375/240.28 |
| 2010/0054154 A1 | * | 3/2010 | Lambert et al. | 370/254 |
| 2010/0235486 A1 | * | 9/2010 | White et al. | 709/223 |
| 2011/0122877 A1 | * | 5/2011 | Gelke et al. | 370/400 |
| 2011/0200048 A1 | * | 8/2011 | Thi et al. | 370/392 |
| 2011/0222560 A1 | * | 9/2011 | Biederman et al. | 370/503 |
| 2011/0310956 A1 | * | 12/2011 | Lin et al. | 375/240.02 |
| 2012/0050318 A1 | * | 3/2012 | Khasnis et al. | 345/625 |
| 2012/0066711 A1 | * | 3/2012 | Evans et al. | 725/32 |
| 2012/0082156 A1 | * | 4/2012 | Swartzentruber et al. | 370/389 |
| 2013/0058419 A1 | * | 3/2013 | Ye et al. | 375/240.25 |
| 2013/0083859 A1 | * | 4/2013 | Nemiroff et al. | 375/240.25 |
| 2013/0304804 A1 | * | 11/2013 | Glasser | 709/203 |
| 2013/0342632 A1 | * | 12/2013 | Su | 348/14.01 |

* cited by examiner

Primary Examiner — Victor Kostak
(74) Attorney, Agent, or Firm — Lindauer Law, PLLC

(57) ABSTRACT

Content comprising audio and video may be processed by different processing pipelines, but latencies between these pipelines may differ due to differences in data compression, processing loads, and so forth. The time between entry and exit from the pipeline of a frame is measured to determine pipeline latency. The pipeline latency may be used to shift timing of audio frames, video frames, or both, such that they are synchronized during presentation.

20 Claims, 8 Drawing Sheets

AUDIO AND VIDEO SYNCHRONIZATION

BACKGROUND

Audio data, video data, or both, is presented in a wide variety of situations. In situations where audio data and video data are presented contemporaneously, such as with a movie, slideshow, and so forth, presentation of the audio data and the video data may become unsynchronized. For example, the video may depict a person speaking but corresponding audio may have already been presented, or vice versa. This unsynchronized presentation may result in an adverse user experience.

Figure 1:
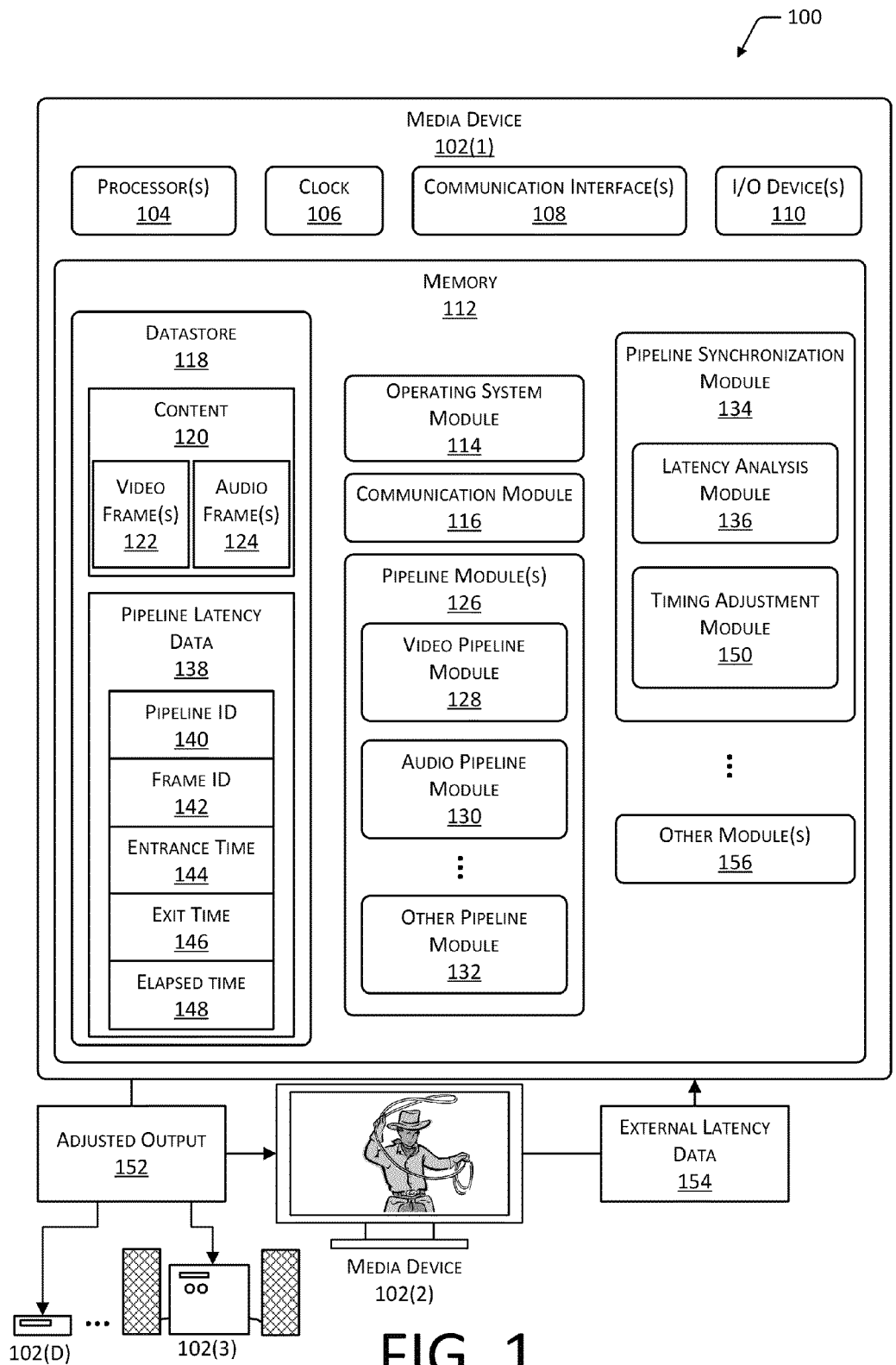
FIG. 1 is an illustrative system for generating adjusted output configured to synchronize audio data and video data processed by one or more pipelines.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Audio data contains information which, when presented, produces sounds audible to a user. Similarly, video data contains information which, when presented, produces a series of images visible to the user as a moving image. Audio data and video data may be presented together, such as in movies, television, slideshows, and so forth.

Preferably, the audio data and the video data are synchronized such that audible events, such as the sound of a person speaking or a door closing, occur contemporaneously with an associated visual event, such as the image of the person's mouth moving or the door closing.

Media devices may include televisions, set-top boxes, smartphones, tablet computers, desktop computers, laptop computers, in-vehicle systems, and so forth. The media devices may use one or more pipelines to process the audio data, the video data, or both the audio data and video data. A pipeline, as used in this disclosure, is a set of data processing elements which operate to manipulate input data and generate output data. These data processing elements may include instructions executing on or implemented by one or more of a central processor unit ("CPU"), a graphic processor unit ("GPU"), an application specific integrated circuit ("ASIC"), a digital signal processor ("DSP"), and so forth. A pipeline may be configured to accept data in a first format or configuration and provide output which is modified into a second format or configuration. These pipelines may perform various functions such as compressing audio, decompressing audio, compressing video, decompressing video, converting data from a first format to a second format, and so forth. For example, a first pipeline may deliver uncompressed video as an output while a second pipeline delivers compressed audio as an output.

The data may be processed by the pipeline in frames. Each frame comprises data expressed as bits. The data in the frame may comprise a sample of audio data, a portion of an image, and so forth. In some implementations a size of the frames as measured in bits may be constant, or may vary over time. For example, one frame may have more bits than another.

Processing of a frame by the pipeline takes some time greater than zero. Elapsed time as measured from when a frame enters the pipeline until that frame, or the output corresponding to that frame, exits is designated as pipeline latency. As frames are processed, the pipeline latency may vary due to different factors. These factors may include loading of the pipeline, frame size, contention for other resources coupled to the pipeline, and so forth. As a result, pipeline latency is non-deterministic.

Different pipelines may exhibit different pipeline latencies. For example, at a given moment in time, an audio pipeline is processing audio frames with a pipeline latency of 10 millisecond ("ms"), while a video pipeline is processing video frames with a pipeline latency of 50 ms. As a result of pipeline latencies which change over time, differ between different pipelines, and so forth, the audio frames and corresponding video frames may drift out of alignment. For example, during presentation of movie with audio data and video data intended to be synchronized, due to different pipeline latencies, the audio and the video may be misaligned by +57 ms, while in another portion of the same movie the audible events and the visual events may be misaligned by −127 ms. As used in this disclosure, a positive misalignment such as +57 ms indicates the audio leads the corresponding video, while a negative misalignment such as −127 ms indicates the audio lags the video.

Frames may encode an original timestamp or time offset. This timestamp indicates the sequence and timing at which those frames should be presented. For example, if the pipeline latencies were to be zero, the audio and video would be synchronized. However, due to the differences in pipeline latencies as described below, presentation becomes unsynchronized.

Described in this disclosure are systems and techniques for determining pipeline latency of one or more pipelines. In one implementation, entrance time data may be appended to frames prior to entry into a pipeline. Frames exiting the pipeline are analyzed to determine an exit time. Based on an analysis of the entrance time and the exit time, pipeline latency for that pipeline during the transit of that frame may be acquired. Pipeline latency data may be acquired for many frames, and may be acquired during normal operation of the pipeline. As conditions affecting the pipeline change, so the pipeline latency data may reflect these changes.

With the pipeline latency determined, corrective actions may be taken to configure the frames for synchronized presentation. Based on these pipeline latencies, adjusted timestamps may be generated by taking the original timestamps and performing one or more operations, such as adding or subtracting values indicative of time. For example, the pipeline latency of a video processing pipeline may be determined, indicating that a plurality of video frames are delayed by a particular amount of time by their passage through the pipeline. The audio frames which correspond to the delayed video frames may have their original timestamps replaced by adjusted timestamps which include this delay. Upon presentation of the video frames and the audio frames with the adjusted timestamps, the audio and the video are now synchronized with one another.

A first media device may send data to one or more other media devices. For example, a set top box media device may send a stream of content which includes audio frames and video frames to a television media device. The television or other media device receiving the data may have internal pipelines which introduce further delays. The pipeline latencies in these media devices may be determined, and external latency data may be generated. This external latency data may be received by the first media device and used to generate pipeline latency data which is indicative of pipeline delays in the first media device as well as the one or more other media devices. This allows for synchronization of content across two or more devices.

By determining pipeline latency as actually experienced by the pipelines in the media devices, the content may be properly synchronized. By providing synchronized presentation, the overall user experience during presentation of the audio data and the video data may be improved.

Illustrative System

FIG. 1 is an illustrative system 100 for generating adjusted output configured to synchronize audio data and video data processed by one or more pipelines. In this illustration, media devices 102(1), 102(2), . . . , 102(D) are depicted. The media devices 102 may include televisions, set top boxes, gaming consoles, cable television interfaces, audio/video receivers, tablet computers, smartphones, optical disk readers, and so forth. The optical disk readers may include devices compatible with compact disks ("CDs"), digital versatile disks ("DVDs"), Blu-ray™ discs, and so forth. The optical disk readers in some implementations may be configured to write data as well as read.

In this illustration, media device 102(1) is a set top box, the media device 102(2) is a display device such as a television, and the media device 102(3) is an audio video receiver ("AVR") media device. The set top box media device 102(1) may provide various functions such as controlling the other media devices 102(2), . . . 102(D), presenting content, presenting a user interface, and so forth.

The media device 102 may include one or more processors 104 configured to execute one or more stored instructions. The processors 104 may include a central processor unit ("CPU"), a graphic processor unit ("GPU"), an application specific integrated circuit ("ASIC"), a digital signal processor ("DSP"), and so forth. The processors 104 may comprise one or more cores. The media device 102 may also include one or more clocks 106 or other timing devices configured to provide an indication of passing time. These clocks 106 may be discrete devices, or may be integrated into the one or more processors 104 or other components.

The media device 102 may include one or more communication interfaces 108 to allow the processor 104 or other portions of the media device 102 to communicate with other devices. The communication interfaces 108 may include one or more of an inter-integrated circuit ("I2C") interface, serial peripheral interface bus ("SPI"), or Universal Serial Bus ("USB"). Ethernet compliant with the IEEE 802.3 standard promulgated by the Institute of Electrical and Electronics Engineers ("IEEE") may be provided. A high definition multimedia interface ("HDMI") may be provided. The HDMI interface may be configured to support control data sequences which are compliant with at least a portion of the Consumer Electronics Control ("CEC") standard, Ethernet over HDMI, and so forth.

A wireless local area network ("WLAN") interface may be provided. In one implementation, the WLAN interface may be configurable to support connections compliant with at least a portion of the IEEE 802.11 specification, such as to Wi-Fi™ devices. A personal area network ("PAN") may also be provided. In one implementation, the PAN interface may be configurable to support connections compliant with at least a portion of the IEEE 802.15.1 specification, such as to Bluetooth® devices. In another implementation, the PAN interface 108 may be configurable to support connections compliant with at least a portion of the IEEE 802.4 specification, such as to ZigBee® devices. Multiple WLANs, PANs, or other connections may be supported simultaneously by the media device 102. For example, Bluetooth® and ZigBee® connections may be available at the same time.

Wide area network ("WAN") interfaces may also be provided. The WAN interfaces may be configurable to support connections compliant with the data over cable service interface specification ("DOCSIS"), digital subscriber lines, and so forth.

The communication interfaces 108 may also include wireless wide area network ("WWAN") interfaces configurable to couple to cellular, satellite, or other carriers. For example, the WWAN interfaces may allow for coupling to 3G networks, Long-Term Evolution ("LTE") or 4G networks, and so forth.

An optical interface comprising an optical transmitter, an optical receiver, or both an optical transmitter and an optical receiver may be provided. The optical interface may use free-space transmission, optical fibers, waveguides, or a combination thereof. For example, the optical interface may implement TOSLINK® as promulgated by Toshiba Corp. The optical interface may use visible light, infrared light, or ultraviolet light to transmit or receive information. For example, the optical interface may be configured to generate infrared signals configured to control one or more of the other media devices 102.

Other interfaces may also be provided, such as acoustic, analog video, analog audio, IEEE 1394, and so forth. For example, an acoustic interface may be configured to receive or transmit information using ultrasonic sounds.

The communication interfaces 108 may couple to one or more input/output (I/O) devices 110. The I/O devices 110 may include buttons, microphones, touch sensors, displays, haptic output devices, and so forth. The displays may include liquid crystal displays, interferometric displays, electrophoretic displays, electrowetting displays, cholesteric displays, light emitting diode displays, and so forth. In some implementations, the displays may also utilize image projection systems having liquid crystal displays, digital micromirror devices, microelectromechanical systems (MEMS) spatial light modulators, liquid crystal on silicon displays, light emitting diodes, lasers, and so forth.

The I/O devices 110 may be physically incorporated with the media device 102 or may be externally placed. The media device 102 may also include one or more busses or other internal communications hardware or software that allow for the transfer of data between the various modules and components of the media device 102.

As shown in FIG. 1, the media device 102 includes one or more memories 112. The memory 112 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 112 provides storage of computer readable instructions, data structures, program modules, and other data for the operation of the media device 102.

The memory 112 may include at least one operating system ("OS") module 114. The OS module 114 is configured to manage hardware resource devices such as the clock 106, the communication interfaces 108, the I/O devices 110, and provide various services to applications or modules executing on the processors 104. Also stored in the memory 112 may be one or more modules described below. These modules may be executed as foreground applications, background tasks, daemons, and so forth.

A communication module 116 is configured to support communications with other devices such as remote controls, access points, other media devices 102, and so forth. The communication module 116 may be configured to send, receive, or send and receive data between the devices.

A datastore 118 in the memory 112 may use a flat file, database, linked list, tree, or other data structure to store information. As illustrated here, the datastore 118 contains at least a portion of content 120. The content 120 may include audio, video, electronic books ("eBooks"), applications, games, and so forth. The content 120 may include different portions of data that are configured to be synchronized during presentation. For example, a movie or television show may comprise video frames 122 and audio frames 124. In other implementations, the data intended to be presented in synchronized fashion may encode other information. For example, the audio frames 124 may be synchronized with a slideshow.

Pipeline modules 126 may be stored in the memory 112. The pipeline modules 126 may be configured to accept data in a first format or configuration and provide output, which is modified into a second format or configuration. The pipeline modules 126 may perform various functions such as compressing audio, decompressing audio, compressing video, decompressing video, converting data from a first format to a second format, and so forth.

Depicted in FIG. 1 are a video pipeline module 128 and an audio pipeline module 130. The video pipeline module 128 is configured to process the video frames 122. For example, the video pipeline module 128 may accept compressed video and output uncompressed video. The audio pipeline module 130 is configured to process the audio frames 124. For example, the audio pipeline module 130 may be configured to accept compressed audio to output uncompressed audio. In some implementations, the audio pipeline module 130 may be configured to pass through compressed audio, or the audio pipeline module 130 may be configured to provide compressed audio in another compression format.

Other pipeline modules 132 may also be present. For example, a camera pipeline module may be configured to process incoming video data received from a video camera.

The pipeline modules 126 may process frames of data. A frame comprises a portion or segment of data, which may be expressed as bits. The data in the frame may comprise a sample of audio data, a portion of an image, and so forth. In some implementations a size of the frames as measured in bits may be constant, or may vary over time. For example, one video frame 122 may have more bits than another video frame 122.

As described above, the time taken by a packet to be processed by the pipeline module 126 may vary. As a result, output from multiple pipelines which is intended to be presented synchronously may become unsynchronized at presentation. A pipeline synchronization module 134 is depicted, which includes a latency analysis module 136.

The latency analysis module 136 is configured to determine pipeline latency data 138. The pipeline latency data 138 provides data indicative of time spent by a frame during processing in the pipeline module 126. The pipeline latency data 138 may include a pipeline identifier ("pipeline ID") 140. The pipeline ID 140 provides an indicator of which pipeline module 126 the pipeline latency data 138 is associated with. For example, the pipeline ID 140 may indicate that the pipeline latency data 138 is indicative of delays associated with the video pipeline module 128. In some implementations, the pipeline latency data 138 may include a frame identifier ("frame ID") 142. The frame ID 142 comprises data that distinguishes a particular frame from other frames. For example, the frame ID 142 may be used to distinguish between video frames 122.

The pipeline latency data 138 may include entrance time 144 data, which is indicative of entry of a frame into a pipeline. In one implementation, the entrance time 144 may be determined based on data received from the clock 106. For example, the entrance time 144 may be a 64-bit number indicating a particular time on the clock 106. Likewise, exit time 146 data is indicative of the frame leaving the pipeline.

Based on the entrance time 144 and the exit time 146, the latency analysis module 136 may determine an elapsed time 148. This elapsed time 148 is indicative of the duration of time for one or more frames spent being processed by one of the pipeline modules 126. The elapsed time 148 may be determined for one or more of a plurality of frames, which are being processed by the pipeline modules 126. In some implementations, the elapsed time 148 may be determined for every frame transiting a pipeline. In other implementations, the elapsed time 148 may be determined for a sampling of frames, such as every $20^{th}$ frame. The determination of the pipeline latency data 138 is discussed in more detail below with regard to FIGS. 4-5.

The pipeline synchronization module 134 may also include a timing adjustment module 150. The timing adjustment module 150 is configured to use the pipeline latency data 138 to generate adjusted output 152. In one implementation, based on pipeline latencies, adjusted timestamps may be generated by taking original timestamps from the frames and performing one or more operations, such as adding or subtracting values indicative of time. For example, the pipeline latency of the video pipeline module 128 may be determined, indicating that the video frames 122 are delayed by a particular amount of time by their passage through the pipeline. The adjusted output 152 may comprise the audio frames 124 which correspond to the delayed video frames 122 that have had their original timestamps replaced by adjusted timestamps which include this delay. Upon presentation of the adjusted output 152, the audio and the video is now synchronized. The adjusted timestamps are discussed in more detail below with regard to FIG. 6

The timing adjustment module 150 is configured to provide adjusted output 152 within which two or more streams of frames are synchronized to within a synchronization threshold range of one another. For example, the audio frames 124 may be synchronized to the video frames 122 such that audio is configured to be presented with the audio frames 124 leading or lagging the video frames 122 by 40 (ms) or less. The synchronization threshold range may be expressed as a time range, percentage, frame count, and so forth.

The adjusted output 152 may then be presented using one or more of the I/O devices 110 or sent using the one or more communication interfaces 108 to one or more media devices 102(D) or other output devices. In some implementations, the other device, such as the media device 102(2) illustrated here, may include pipelines that further process incoming data, such as the adjusted output 152. For example, the media device 102(2) may include a pipeline module 126(2) configured to render data in the video frames 122 as images on a liquid crystal display. As a result, the pipeline module 126(2) of the media device 102(2) may introduce additional pipeline latencies, which may result in unsynchronized presentation of the content 120.

As illustrated here, another device such as the media device 102(2) may include a pipeline synchronization module 134(2) which is configured to generate external latency data 154. The external latency data 154 provides pipeline latency data 138(2) which is indicative of the pipeline module 126(2) on the media device 102(2). This external latency data 154 may be sent back to the media device 102(1) using one or more communication interfaces 108. The media device 102(1) may receive the external latency data 154. The pipeline synchronization module 134 of the media device 102(1) may then generate the adjusted output 152 based at least in part on the external latency data 154. Using this feedback loop, the media device 102(1) generates adjusted output 152 which is configured to be presented synchronously.

The memory 112 of the media device 102(1) may also include other modules 156. In one implementation, a digital rights management module may be provided to support processing of content 120 that is protected using one or more digital rights management schemes.

Figure 2:
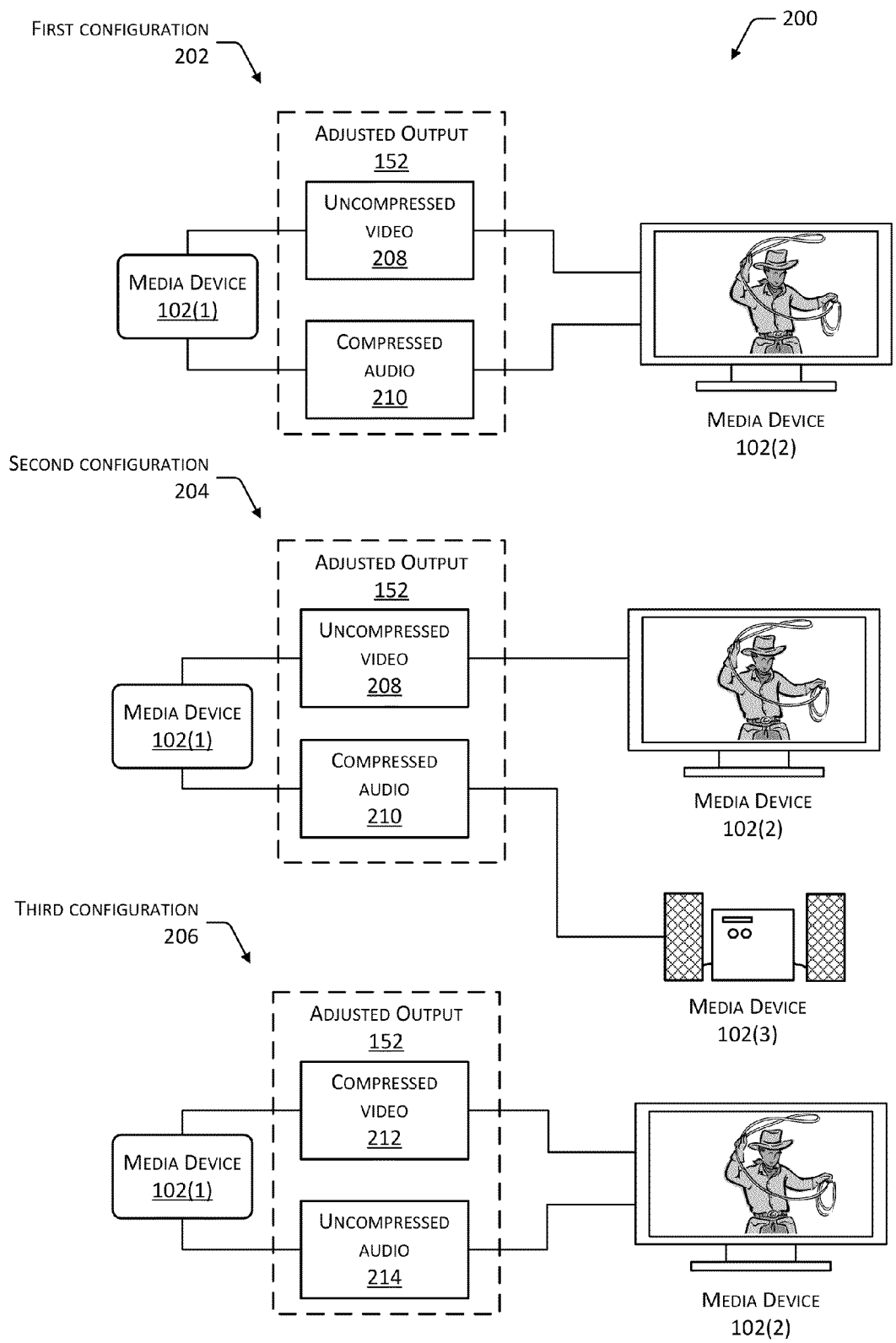
FIG. 2 illustrates different scenarios in which the adjusted output may be used to synchronize audio and video data.

FIG. 2 illustrates different scenarios 200 in which the adjusted output 152 may be used to synchronize audio and video. Depicted are a first configuration 202, a second configuration 204, and a third configuration 206. These configurations are depicted by way of illustration and not as a limitation.

The first configuration 202 includes the set top box media device 102(1) coupled using one or more communication interfaces 108 to the television media device 102(2). In this illustration, the adjusted output 152 comprises uncompressed video 208 and compressed audio 210. For example, the uncompressed video 208 may comprise digital video sent along the HDMI communication interface 108, while the compressed audio 210 may comprise MPEG-4 as promulgated by the Motion Picture Experts Group. Traditionally, the difference in pipeline latencies between the uncompressed video 208 and the compressed audio 210 may result in unsynchronized presentation on the media device 102. Using the techniques described above, the pipeline synchronization module 134 provides adjusted output 152, which is presented by the television media device 102(2) with the audio and the video synchronized within the synchronization threshold.

In comparison, the second configuration 204 illustrates the media device 102(1) sending adjusted output 152 to more than one media device 102. As shown, the uncompressed video 208 is sent to the television media device 102(2), while the compressed audio 210 is sent to the AVR media device 102(3). The media device 102(2) and the media device 102(3) may have different internal pipeline latencies associated with rendering the data as output. For example, the television media device 102(2) may include a video pipeline module 128(2), which includes a fast DSP configured to render the uncompressed video frames 122 in 10 ms. In contrast, the AVR media device 102(3) may have a slower audio pipeline module 130 which introduces a pipeline latency of 45 ms.

In the second configuration 204, one or more of the television media device 102(2) or the AVR media device 102(3) may be configured with pipeline synchronization modules 134. These pipeline synchronization modules 134 in the respective media devices 102 are configured to provide external latency data 154 to the media device 102(1). The timing adjustment module 150 of the media device 102(1) may, based at least in part on the external latency data 154, generate adjusted output 152 that, when presented on these different media devices 102(2) and 102(3), is synchronized.

The third configuration 206 illustrates when the media device 102(1) is providing the adjusted output 152 to the media device 102(2) that includes compressed video 212 and uncompressed audio 214. For example, the compressed video 212 may comprise MPEG-4 video while the uncompressed audio 214 may comprise pulse-code modulation ("PCM").

As illustrated here, regardless of the format of the output, number of destination media devices 102(D) receiving the data, the pipeline modules 126 used, and so forth, the pipeline synchronization module 134 may be used to provide the adjusted output 152. The adjusted output 152 may be synchronized for immediate presentation on the media device 102(1), or the adjusted output 152 may be configured such that it is synchronized on presentation at other media devices 102(2)-(D).

Figure 3:
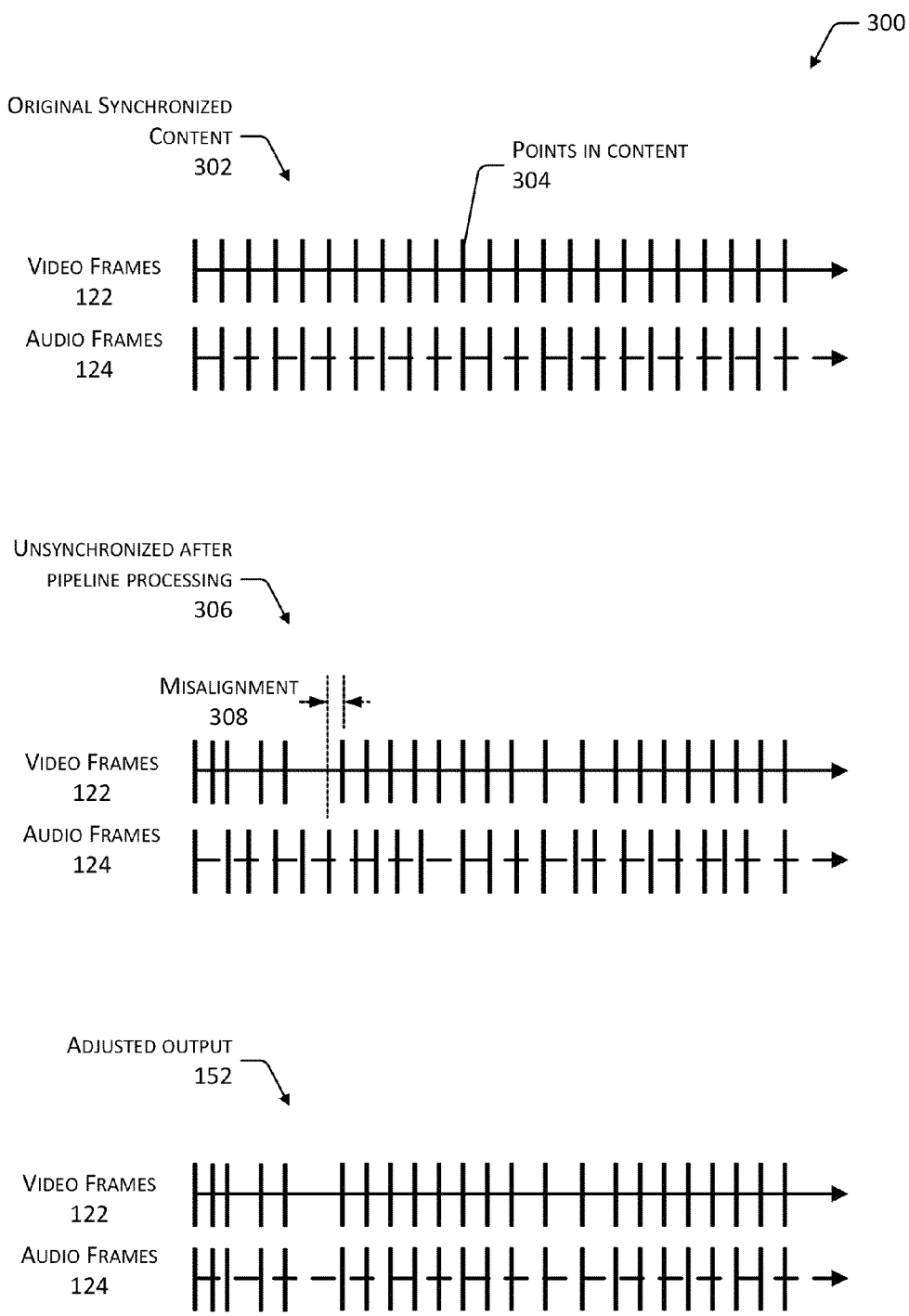
FIG. 3 illustrates original synchronized content, unsynchronized content, and adjusted output.

FIG. 3 illustrates a comparison 300 between original synchronized content, unsynchronized content, and adjusted output 152. Original synchronized content 302 is illustrated here as a plurality of video frames 122 and audio frames 124. The content 120 as produced, distributed, and so forth, is originally synchronized. That is, particular portions of video are associated with particular portions of audio. For example, an image of a bat striking a ball has an associated sound of the impact. For the sake of illustration, and not by way of limitation, points in content 304 indicate correspondence between these portions. The actual number of video frames 122 to audio frames 124 may vary due to changes in encoding, relative sizes, and so forth. For example, a particular video frame 122 may be associated with several audio frames 124.

In comparison, content 120 which has become unsynchronized after pipeline processing 306 is illustrated. In this illustration, the points in content 304 have been shifted around due to variations in the pipeline latency. For example, some video frames 122 are initially delivered more quickly, while other video frames 122 have been delayed, resulting in gaps. Similarly, the points in content 304 of the audio frames 124 are no longer evenly distributed. As a result of these variations in the pipeline latency, the video frames 122 and corresponding audio frames 124 are in misalignment 308. For example, as shown here in 306, the misalignment 308 indicates the audio frames 124 are leading the associated video frames 122. Should this unsynchronized content 120 be presented, a user would hear from the speakers the sound of the impact of the bat and ball before the corresponding image of the strike is presented on the display.

An illustration of adjusted output 152 is also depicted here. In this illustration, the audio has been synchronized with the video. In other implementations, the video may be synchronized with the audio, or the audio and the video may be synchronized to another reference. The timing adjustment module 150 may have generated adjusted timestamps for the audio frames 124, resulting in their synchronization during presentation. For example, the points in content 304 in the video frames 122 and the audio frames 124 now correspond to one another, and the misalignment 308 is not present. Upon presentation, the content 120 made up of the video frames 122 and the audio frames 124 is synchronized. As a result, the user experiences presented content in which the audio matches the video presented.

As described above, the adjusted output 152 may be synchronized to within a synchronization threshold range. The synchronization threshold range may be expressed as a time range, percentage, frame count, and so forth. For example, the synchronization threshold may be set so that the audio frames 124 lead or lag the video frames 122 by 21 frames or less.

Figure 4:
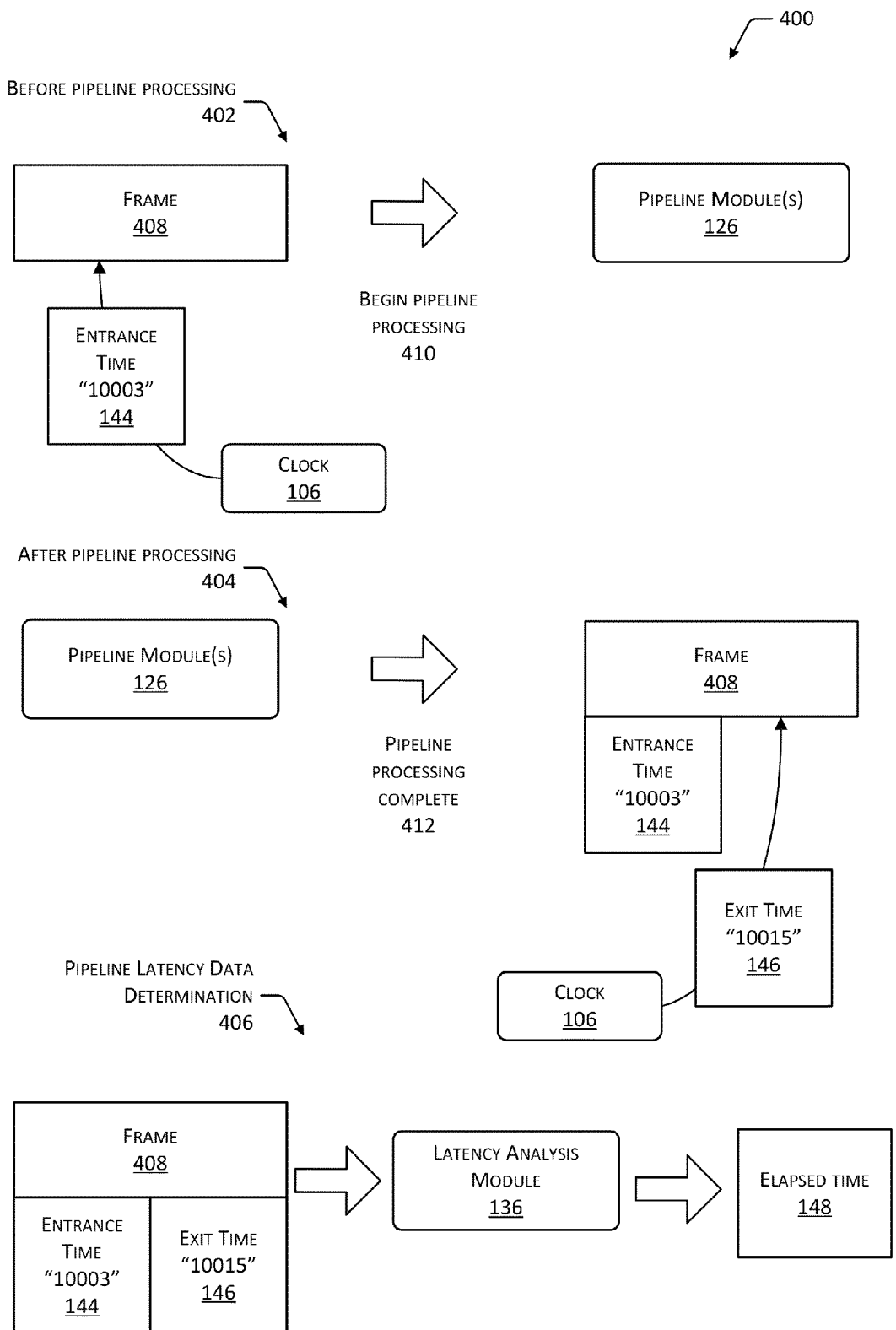
FIG. 4 illustrates appending entrance times to frames to determine pipeline latency data.

FIG. 4 illustrates one implementation 400 the latency analysis module 136 may use to determine pipeline latency data 138. Illustrated are examples before pipeline processing 402, after pipeline processing 404, and the pipeline latency data determination 406.

Before pipeline processing 402, an entrance time 144 is affixed to, or embedded within, a frame 408. For example, latency analysis module 136 may access timing data from the clock 106 and generate a 64-bit integer indicative of current time. The frame 408 may carry audio, video, or other data. The frame 408, with the entrance time 144, is sent to an associated pipeline module 126, and pipeline processing begins 410. For example, where the frame 408 comprises video data, the video frame 122 with the entrance time 144, is sent to the video pipeline module 128 and processing begins. In some implementations, the pipeline module 126 may be configured to affix or embed the entrance time 144 to the frame 408 after entrance to the pipeline.

As shown after pipeline processing 404, the pipeline module 126 has completed pipeline processing 412 and emits the frame 408 which includes the entrance time 144. An exit time 146 may be affixed to, or embedded within, the frame 408. For example, latency analysis module 136 may access timing data from the clock 106 and generate a 64-bit integer indicative of current time. The frame 408 now includes the entrance time 144 and the exit time 146, which are indicative of passage through the pipeline module 126. In some implementations, the pipeline module 126 may be configured to affix or embed the exit time 146 to the frame 408 before exit from the pipeline.

The pipeline latency data determination 406 illustrates the latency analysis module 136 processing the frame 408 with the entrance time 144 and exit time 146 data attached. The latency analysis module 136 may perform one or more calculations on the entrance time 144 data and the exit time 146 data to generate the pipeline latency data 138. This may be expressed as a time differential indicative of a processing time by the processing pipeline. For example, the entrance time 144 may be subtracted from the exit time 146 to determine the elapsed time 148.

In other implementations, rather than affixing or embedding the exit time 146, the current time from the clock 106 may be used as the exit time 146. The entrance time 144 and the exit time 146 (when present) may be stripped from the frame 408 once the pipeline latency data 138 has been determined. For example, the timing adjustment module 150 may remove the entrance time 144 and the exit time 146 when generating the adjusted output 152.

Figure 5:
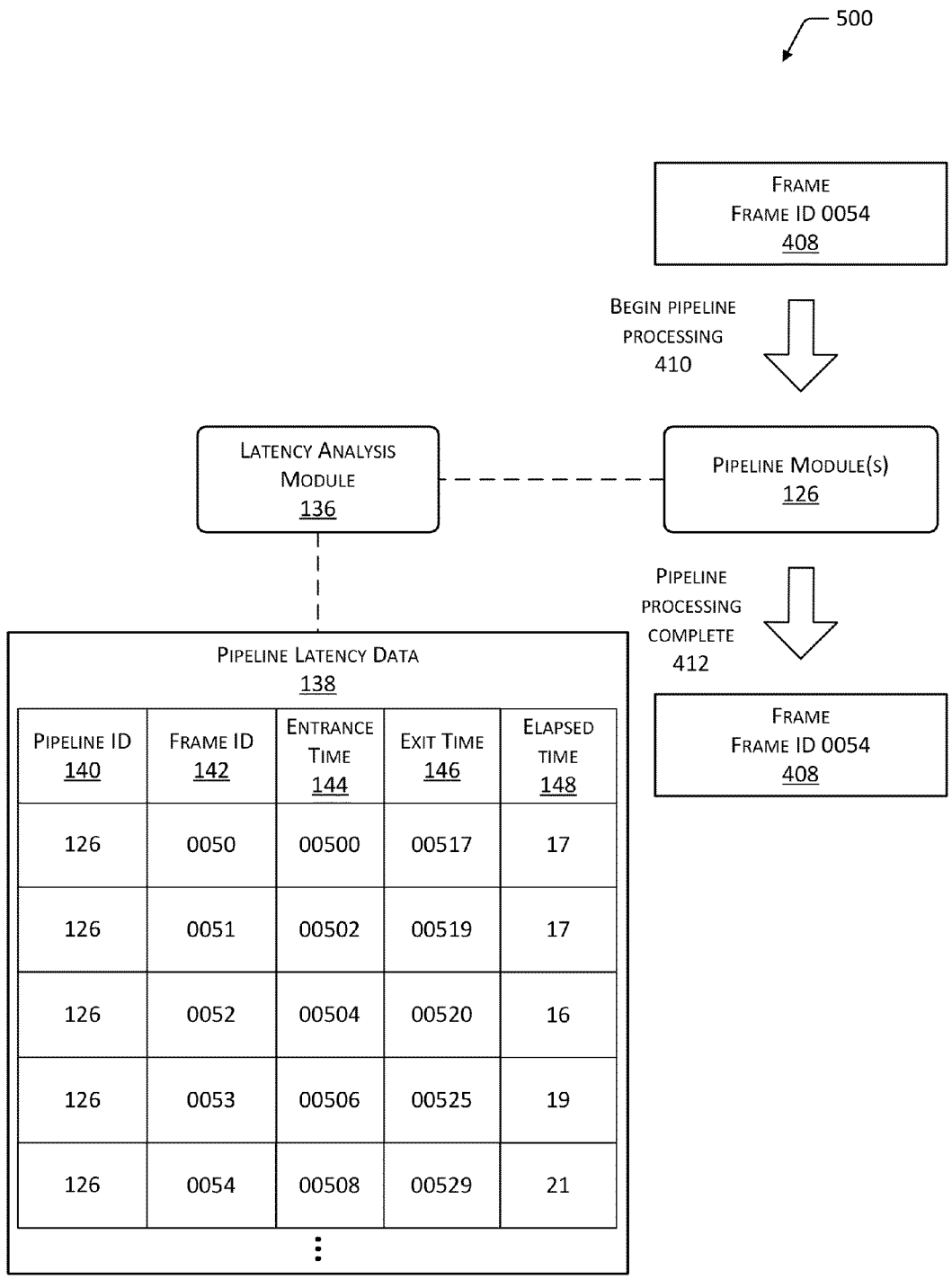
FIG. 5 illustrates monitoring frames to determine pipeline latency data.

FIG. 5 illustrates another implementation 500 of determining pipeline latency data 138 by monitoring or tracking particular frames 408 during passage through the pipeline module 126. In comparison to the implementation discussed above in FIG. 4 where data is appended to or embedded within the frames 408, the elapsed time 148 may be determined by monitoring when a particular frame 408 enters or exits the pipeline module 126.

In this implementation, the latency analysis module 136 is configured to determine a frame ID 142 of the frame 408, before the frame 408 begins pipeline processing 410. For example, as shown here the frame 408 with the frame ID 142 of "0054" is being sent to the pipeline module 126 for processing, and is subsequently emitted after pipeline processing is complete 412.

As illustrated here, the latency analysis module 136 may generate a table or other data structure which records the frame ID 142, the entrance time 144, and the exit time 146 associated with the frame 408. Where pipeline latency data 138 is being acquired for multiple pipeline modules 126, the pipeline ID 140 may also be stored.

The latency analysis module 136 may access this data, and determine the elapsed time 148. For example, as shown here the frame ID "0054" had an entrance time 144 or "00508" and an exit time 146 of "00529" which indicates an elapsed time 148 of 21. The units of the elapsed time 148 may be ticks, milliseconds, and so forth.

In other implementations, the pipeline latency data 138 may be determined using other techniques such as injection of a telltale frame into the pipeline and watching for output of the telltale frame. The telltale frame may comprise a predetermined pattern, such as all zeroes, all ones, known payload or header, and so forth. The telltale frame may be inserted into the pipeline at a known entrance time 144. The determined pattern of the telltale frame may be detected after exit, and an exit time 146 may be determined.

The pipeline latency data 138 acquired using the techniques of FIG. 4, FIG. 5, or otherwise, may be analyzed using one or more techniques. For example, an average of the elapsed time 148 for a particular pipeline ID 140 may be determined by summing a plurality of individual elapsed times 148 and dividing the sum by a count of the individual elapsed times 148.

Figure 6:
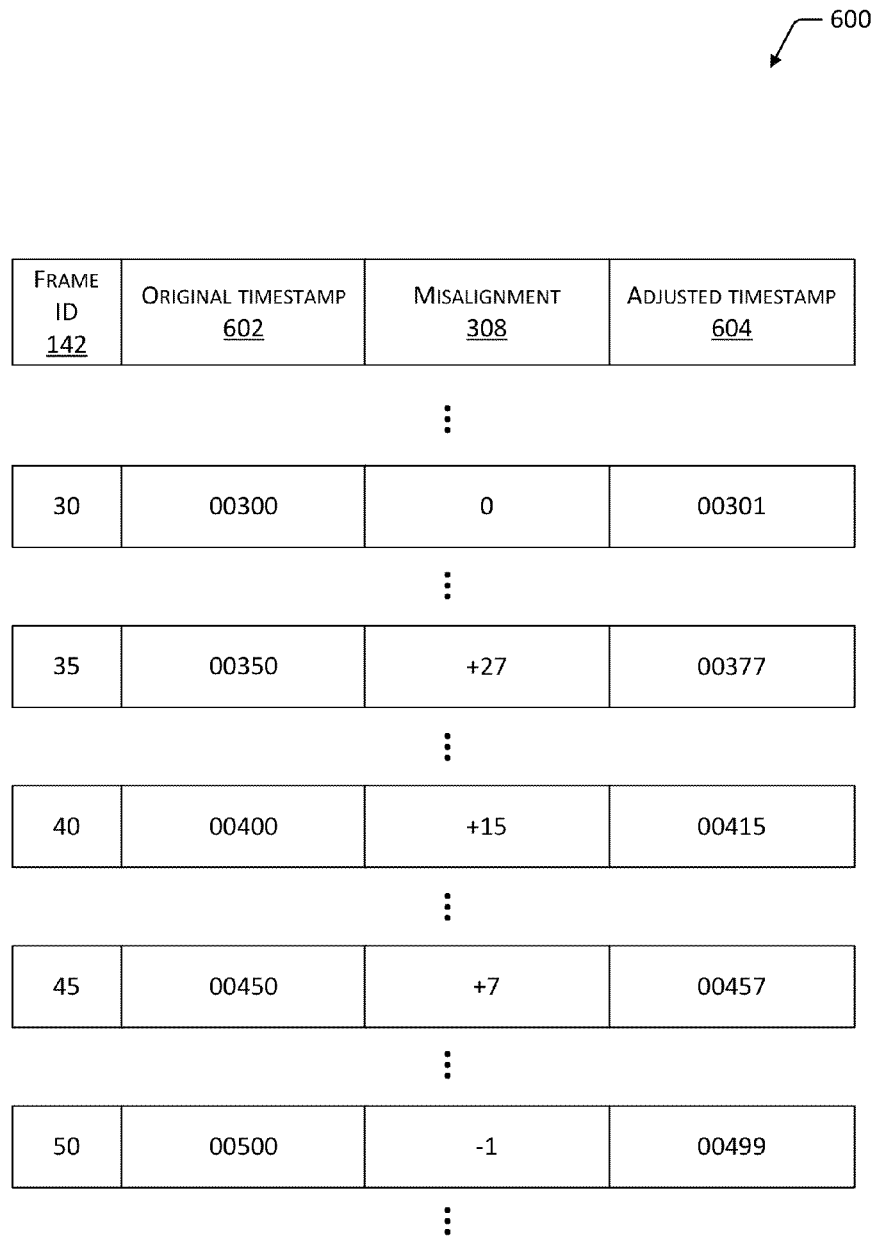
FIG. 6 illustrates adjusting timestamps of frames to generate adjusted output.

FIG. 6 illustrates a block diagram 600 of frames with adjusted timestamps. As described above, once the latency analysis module 136 has determined or received pipeline latency data 138, this information may be used by the timing adjustment module 150. For this illustration, the audio frames 124 are being synchronized to the video frames 122 to produce adjusted output 152, such as described above with respect to FIG. 3.

The frame ID 142 is indicated for the frames 408. In some implementations, the frame ID 142 may be omitted. The frame ID 142 may be indicative of where a particular frame 408 exists within a sequence of other frames 408. For example, the frame ID 142 may comprise an incrementing integer value such that later frames have a greater frame ID 142 than earlier frames 408.

An original timestamp 602 is a timestamp in the frame 408 that is indicative of when the particular frame 408 is to be presented. For example, the original timestamp 602 may include an incrementing integer value which was designated during recording of the data, in post-production, and so forth. During traditional presentation, this original timestamp 602 may be used to determine when the particular frame 408 is presented. However, as described above, frames 408 may experience delays during pipeline processing, resulting in pipeline latency which results in unsynchronized presentation.

As described above, the misalignment 308 data indicates a magnitude and a direction of the pipeline latency relative to a reference. The reference may be the clock 106 time, the output of another pipeline module 126, and so forth. In this illustration, the misalignment 308 data indicates latency of the audio pipeline module 130 relative to the video pipeline module 128. For example, the audio frame 124 "35" has an original timestamp 602 of "00350" and is misaligned by +27, indicating that the audio frame 124 is leading the corresponding video frame 122 by 27 units, such as ms. In effect, the audio frames 124 need to be "slowed down" or designated to play later to bring the audio and the video into synchronization. This may be accomplished by giving the audio frame 124 an adjusted timestamp 604 which is later than the original timestamp 602. In this example, frame "35" has an adjusted timestamp 604 of "00377". During presentation, due to the adjusted timestamp 604, the audio frame 124 "35" is presented along with the corresponding video frame 122.

The adjusted timestamp 604 may operate in the opposite direction. For example, frame "50" has a misalignment of −1 meaning the audio frame 124 is lagging behind the corresponding video frame 124. For frame "50", the adjusted timestamp 604 has been decreased to "00499", which will result in earlier presentation and synchronization with the corresponding video frame 124.

The adjusted timestamps 604 may replace the original timestamps 602 in the adjusted output 152, or the adjusted timestamps 604 may be appended to or embedded within the frames 408. In some implementations, the original timestamps 602 may be modified to form the adjusted timestamps 604. The modifying of the original timestamps 602 to produce the adjusted timestamps 604 may include increasing or decreasing value of the original timestamps 602 in the plurality of frames such that the plurality of frames are synchronized with another plurality of frames during presentation.

Illustrative Processes

Figure 7:
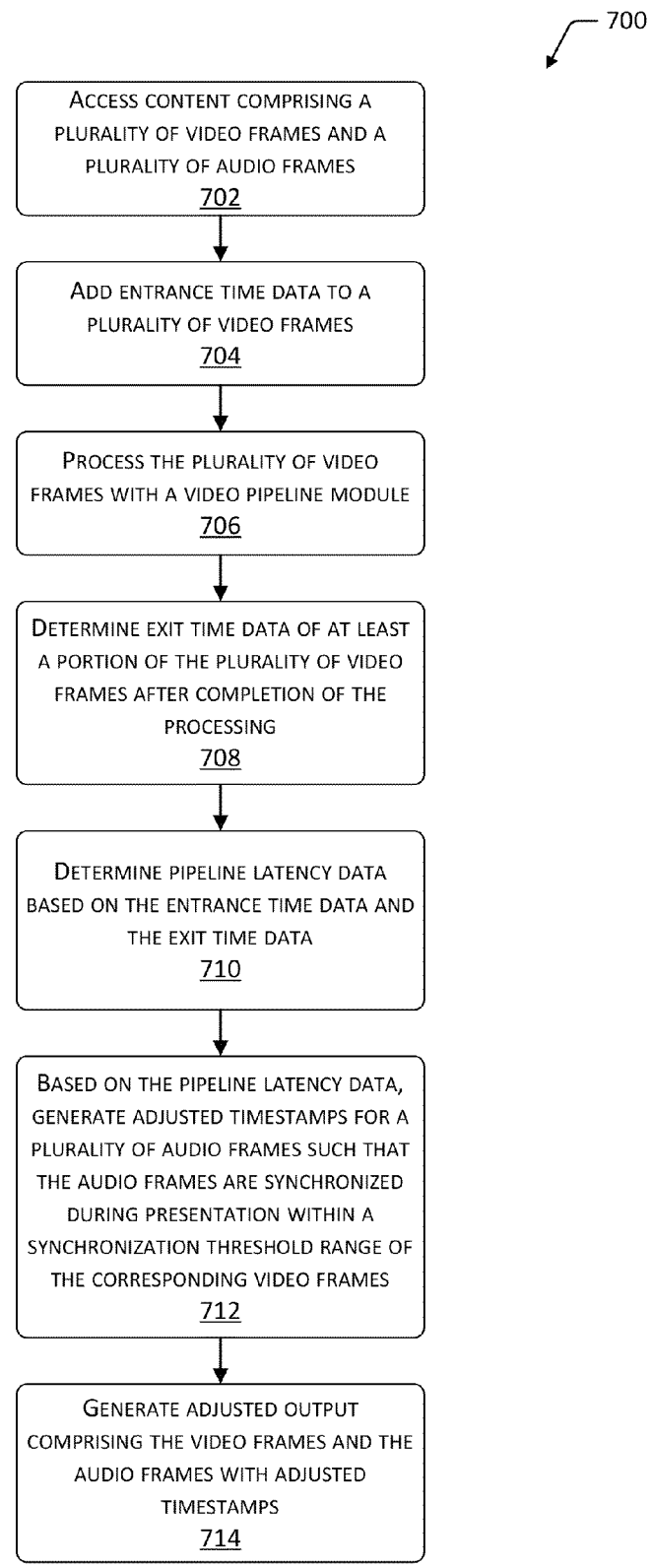
FIG. 7 is a flow diagram of a process of determining video pipeline latency data and adjusting timestamps in audio frames to form adjusted output.

FIG. 7 is a flow diagram 700 of a process of determining video pipeline latency data 138 and adjusting timestamps in audio frames 124 to form adjusted output 152. This process may be implemented at least in part by the pipeline synchronization module 134.

Block 702 accesses content 120 comprising a plurality of video frames 122 and a plurality of audio frames 124. As described above, the video frames 122 and the audio frames 124 are associated with one another, such as an image of a bat striking a ball has an associated sound of the impact.

Block 704 adds entrance time 144 data to at least a portion of the plurality of video frames 122. For example, the entrance time 144 data provided by the clock 106 may be appended to, or embedded within, one or more of the video frames 122.

Block 706 processes the plurality of video frames 122 with the video pipeline module 128. As described above, the video pipeline module 128 may comprise instructions executing on one or more processors 104. In one implementation, the video pipeline module 128 is configured to output data in a format compatible with presentation by a display device and the audio pipeline module 130 is configured to output data in a format compatible with presentation by an audio device. As described above with respect to FIG. 2, the video frames 122 output by the video pipeline module 128 may be uncompressed data and the audio frames 124 output by the audio pipeline module 130 may be compressed data.

Block 708 determines exit time 146 data of at least a portion of the plurality of video frames 122 after completion of the processing with the video pipeline module 128. For example, the latency analysis module 136 may attach the exit time 146 based on data from the clock 106 after the video frames 122 are emitted by the video pipeline module 128.

Block 710 determines pipeline latency data 138 based on the entrance time 144 data and the exit time 146 data. For example, the elapsed time 148 may be calculated by subtracting the exit time 146 from the entrance time 144.

In some implementations, the audio frames 124 may be undergoing processing as well, such as in the audio pipeline module 130. For example, the audio frames 124 may be converted from a compressed format to an uncompressed format.

Block 712, based on the pipeline latency data 138, generates adjusted timestamps 604 for the plurality of the audio frames 124. As described above with regard to FIG. 6, the adjusted timestamps 604 are configured to coordinate presentation of the audio frames 124 to the presentation of the associated video frames 122 within a synchronization threshold range. For example, the adjusted timestamps 604 may be indicative of times which are earlier or later than the original timestamps 602. As described above, the synchronization threshold range may comprise the audio frames 124 leading or lagging the video frames 122 by 40 ms or less during presentation.

Block 714 generates the adjusted output 152 comprising the video frames 122 and the audio frames 124 with the adjusted timestamps 604. The adjusted output 152 may be output using the I/O devices 110, or the adjusted output 152 may be sent to another media device 102 using the one or more communication interfaces 108.

Figure 8:
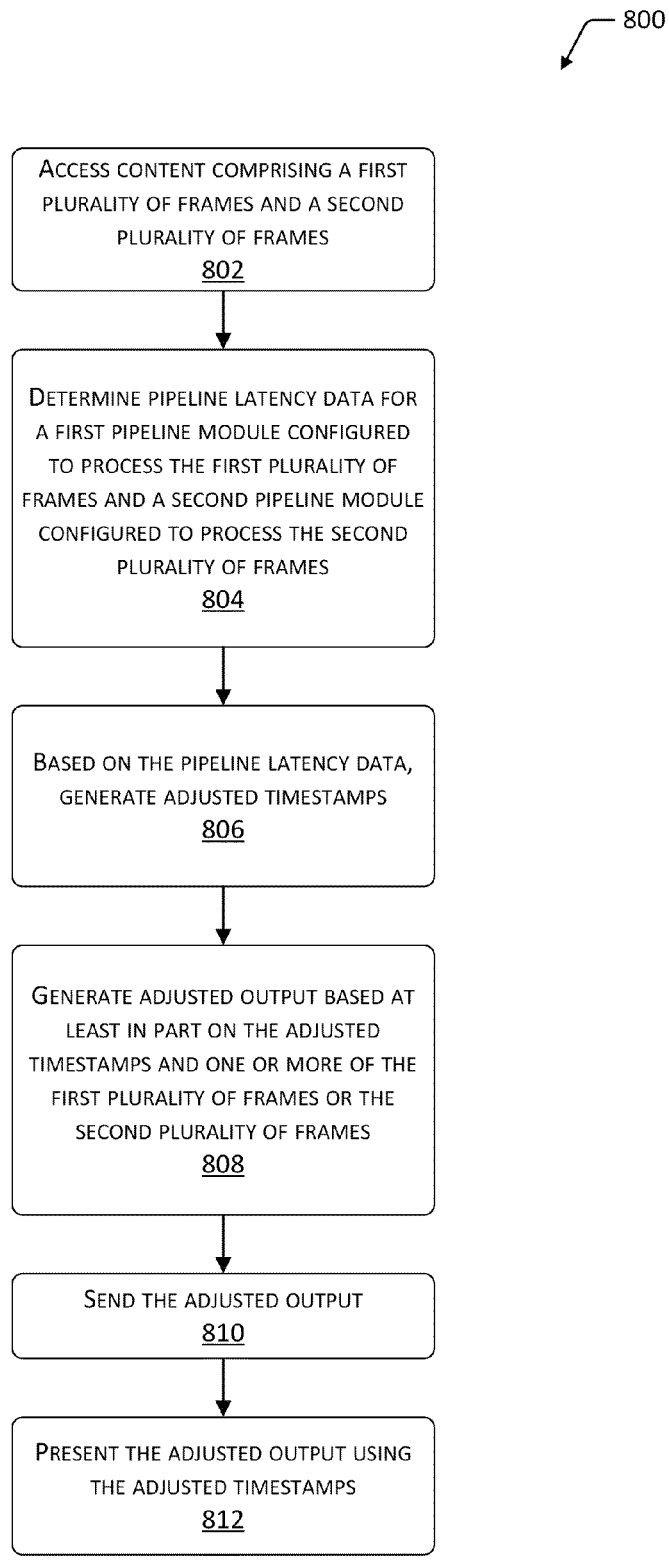
FIG. 8 is a flow diagram of a process of determining pipeline latency data and generating adjusted timestamps based on this data.

FIG. 8 is a flow diagram 800 of a process of determining pipeline latency data 138 and generating adjusted timestamps 604 based on this data. This process may be implemented at least in part by the pipeline synchronization module 134.

Block 802 accesses content 120 comprising a first plurality of frames and a second plurality frames. The first plurality of frames and the second plurality of frames are associated with one another. For example, the first plurality of frames may be video frames 122, and the second plurality of frames may be audio frames 124. In another implementation, the first plurality of frames may comprise audio data, and the second plurality of frames may comprise video data.

In one implementation as described above with regard to FIG. 2, the first plurality of frames may comprise uncompressed video 208 data, and the second plurality of frames may comprise compressed audio 210 data.

Block 804 determines pipeline latency data 138 for a first pipeline module 126 configured to process the first plurality of frames and for a second pipeline module 126 configured to process the second plurality of frames. For example, the pipeline latency data 138 may indicate the latency of the video frames 122 passing through the video pipeline module 128 and the audio frames 124 passing through the audio pipeline module 130.

As described above with regard to FIG. 4, in one implementation, the determination of the pipeline latency data 138 may include appending entrance time 144 data to at least a portion of the first plurality of frames before sending the first plurality of the frames to the first pipeline module 126. Exit time 146 data may be determined for the at least a portion of the first plurality of frames after processing with the first pipeline module 126. One or more calculations may be performed on the entrance time 144 data and the exit time 146 data to determine a time differential indicative of a processing time by the first pipeline module, such as the elapsed time 148. This technique may also be used to determine the pipeline latency of the second pipeline module 126.

As described above with regard to FIG. 5, in one implementation, the determination of the pipeline latency data 138 may include determining the entrance time 144 associated with one or more of the first plurality of frames before processing with the first pipeline module 126. After processing with the first pipeline module 126, the exit time 146 data of the one or more of the first plurality of frames may then be determined. One or more calculations may then be performed on the entrance time 144 data and the exit time 146 data to determine a time differential indicative of a processing time by the first pipeline module 126, such as the elapsed time 148. This technique may also be used to determine the pipeline latency of the second pipeline module 126.

As described above, in some implementations, the external latency data 154 may be determined and used by the pipeline synchronization module 134. The external latency data 154 may be received using the communication interface 108 from an external device. The external latency data 154 is indicative of processing time of the first plurality of frames, the second plurality of frames, or both the plurality of frames and the second plurality of frames by a pipeline module 126 in the external device. For example, the media device 102(3) may send the external latency data 154 to the media device 102(1).

Block 806, based on the pipeline latency data 138, generates adjusted timestamps 604. This may be the pipeline latency for the first pipeline module 126, the second pipeline module 126, or both the first pipeline module 126 and the second pipeline module 126. As discussed, the adjusted timestamps 604 may be based on the elapsed time 148 and relative to a reference, such as the corresponding video frames 122. The adjusted timestamps 604 may be applied to the first plurality of frames, the second plurality of frames, or both the first plurality of frames and the second plurality of frames. In implementations where the external latency data 154 is available, the generation of the adjusted timestamps 604 may be further based at least in part on the external latency data 154.

The adjusted timestamps 604 may replace the original timestamps 602 in the first plurality of frames, the second plurality of frames, or both the first plurality of frames and the second plurality of frames. In other implementations, the adjusted timestamps 604 may be appended to, or embedded within, the frames 408. In another implementation, instead of adjusted timestamps 604, the misalignment 308 data may be appended to, or embedded within, the frames 408.

Block 808 generates adjusted output 152 based at least in part on the adjusted timestamps 604 and one or more of the first plurality of frames or the second plurality of frames. The adjusted output 152, which includes the adjusted timestamps 604, is configured such that output will be synchronized within the synchronization threshold range upon presentation.

Block 810 sends the adjusted output 152 for presentation, such as with one or more of the communication interfaces 108. The adjusted output 152 may be sent to one or more of an internal component of the media device 102 such as a display, to an external device such as another media device 102(2), or both. Block 812 presents the adjusted output 152 on the one or more output devices using the adjusted timestamps 604 such that during presentation, the second plurality of frames are synchronized with the first plurality of frames within a synchronization threshold range.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium, and so forth. Separate instances of these programs can be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations.

Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A computer-implemented method comprising:
   accessing content comprising a plurality of video frames and a plurality of audio frames, wherein the plurality of video frames and the plurality of audio frames are associated with one another;
   adding entrance time data to at least a portion of the plurality of video frames;
   processing the plurality of video frames with a video pipeline module;
   determining exit time data of at least a portion of the plurality of video frames after completion of the processing with the video pipeline module;
   determining pipeline latency data based on the entrance time data and the exit time data;
   processing the plurality of audio frames with an audio pipeline module; and
   based on the pipeline latency data, generating adjusted timestamps for the plurality of audio frames, such that the adjusted timestamps are configured to coordinate presentation of the audio frames to the presentation of the video frames within a synchronization threshold range.

2. The method of claim 1, wherein the plurality of video frames output by the video pipeline module comprise uncompressed data and the plurality of audio frames output by the audio pipeline module comprise compressed data.

3. The method of claim 1, wherein the synchronization threshold range is determined such that the audio frames lead or lag the video frames by 40 milliseconds or less.

4. The method of claim 1, wherein the generating the adjusted timestamps is further based at least in part on external latency data received from an external device, wherein the external latency data is indicative of a processing time of the video frames, the audio frames, or both, by a pipeline module in the external device.

5. A device, comprising:
   a clock;
   at least one memory storing computer-executable instructions; and
   at least one processor configured to access the clock, the at least one memory, and execute the computer-executable instructions to:
     access content comprising a first plurality of frames and a second plurality frames, wherein the first plurality of frames and the second plurality of frames are associated with one another;
     determine an entrance time associated with one or more of a first plurality of frames before processing with a first pipeline module;
     determine exit time data of the one or more of the first plurality of frames after processing with the first pipeline module;
     perform one or more calculations on the entrance time data and the exit time data to determine a first pipeline latency data, the first pipeline latency data comprising a processing time of the one or more of the first plurality of the frames by the first pipeline module; and based on the first pipeline latency data, generate adjusted timestamps.

6. The device of claim 5, wherein the first plurality of frames comprises uncompressed video data and the second plurality of frames comprises compressed audio data.

7. The device of claim 5, wherein the first plurality of frames comprises audio data and the second plurality of frames comprises video data.

8. The device of claim 5, wherein the at least one processor is further configured to execute the computer-executable instructions to:

generate output based at least in part on the adjusted timestamps.

9. The device of claim 5, further comprising a communication interface coupled to the at least one processor; and wherein the at least one processor is further configured to execute the computer-executable instructions to:

receive external latency data from an external device through the communication interface, wherein the external latency data is indicative of a processing time of the first plurality of frames, the second plurality of frames, or both by one or more pipeline modules in the external device; and wherein the generating the adjusted timestamps is further based at least in part on the external latency data.

10. The device of claim 5, wherein the adjusted timestamps replace original timestamps in the first plurality of frames, the second plurality of frames, or both the first plurality of frames and the second plurality of frames.

11. The device of claim 8, further comprising one or more output devices coupled to the at least one processor, and wherein the at least one processor is further configured to execute the computer-executable instructions to:

present the output on the one or more output devices using the adjusted timestamps such that during presentation the second plurality of frames are synchronized with the first plurality of frames within a synchronization threshold range.

12. The device of claim 5, wherein the at least one processor is further configured to execute the computer-executable instructions to:

determine second pipeline latency data for a second pipeline module configured to process the second plurality of frames; and wherein the generating the adjusted timestamps is further based at least in part on the second pipeline latency data.

13. A method comprising:

appending entrance time data to at least a portion of a first plurality of frames;

processing the first plurality of frames with a first pipeline module;

determining pipeline latency data associated with the processing, the pipeline latency data indicative of a processing time of one or more of the first plurality of frames in the first pipeline module based on the entrance time and an exit time of the one or more frames; and modifying original timestamps of a second plurality of frames based on the pipeline latency data, wherein the second plurality of frames are associated with the first plurality of frames.

14. The method of claim 13, wherein the first plurality of frames comprises video data and the second plurality of frames comprises audio data; and the modifying original timestamps comprises increasing or decreasing values of the original timestamps in the second plurality of frames such that the second plurality of frames are synchronized with the first plurality of frames during presentation.

15. The method of claim 14, wherein the audio data comprises compressed digital audio supported for delivery using a high definition media interface ("HDMI").

16. The method of claim 13, the processing further comprising processing the second plurality of frames with a second pipeline module; and modifying original timestamps of the first plurality of frames based on the pipeline latency data.

17. The method of claim 13, further comprising:

receiving external latency data from an external device, wherein the external latency data is indicative of a processing time of one or more frames in a pipeline module of the external device; and wherein the pipeline latency data is further based on the external latency data.

18. The method of claim 13, further comprising:

presenting the first plurality of frames and the second plurality of frames synchronized for presentation within a synchronized threshold range.

19. The method of claim 13, wherein the first plurality of frames comprises audio data and the second plurality of frames comprises video data.

20. The method of claim 13, further comprising:

generating output based at least in part on the modified original timestamps.

* * * * *